Patented July 24, 1934

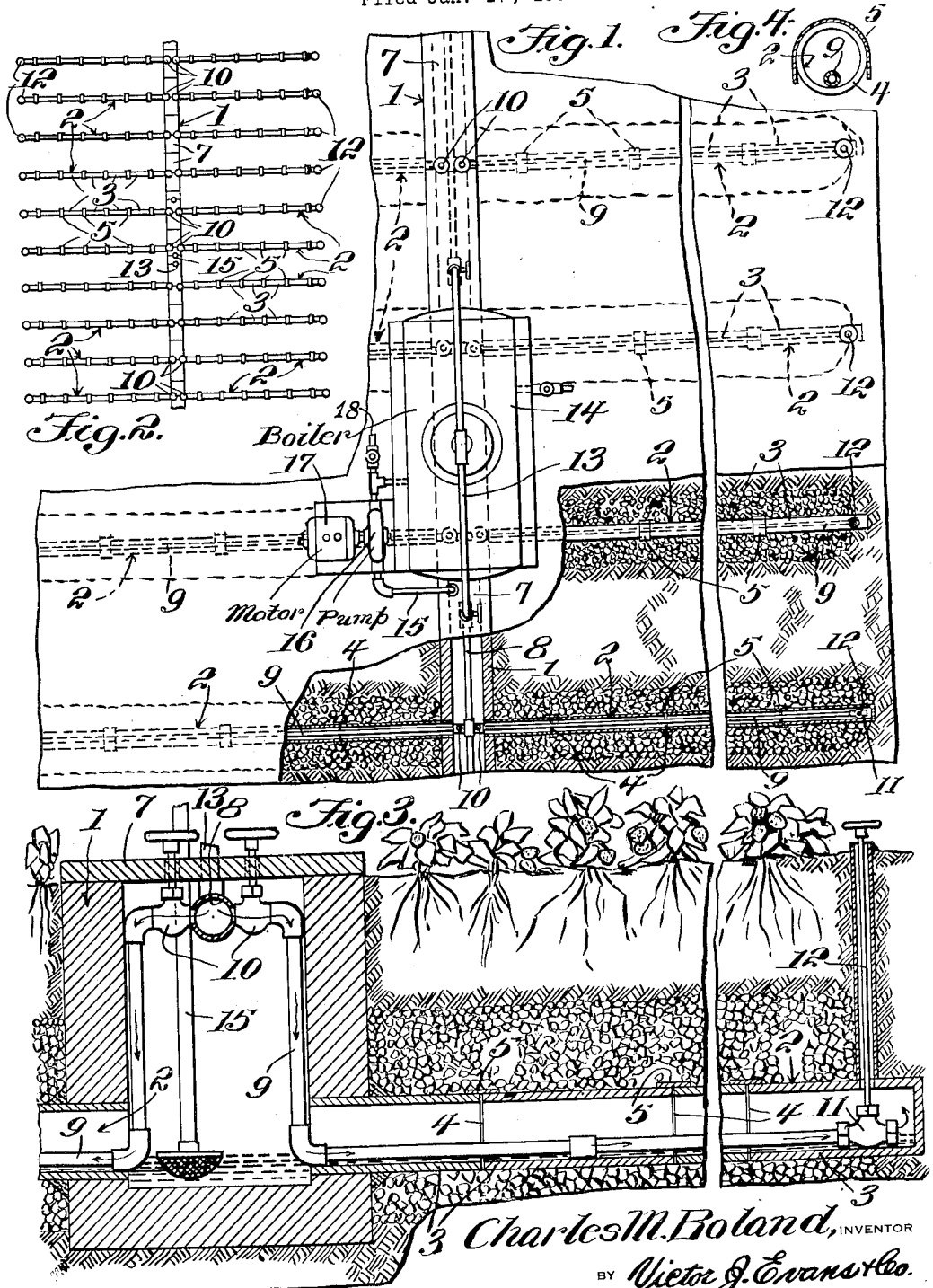

1,967,803

UNITED STATES PATENT OFFICE 1,967,803

COMBINED HEATING AND IRRIGATING SYSTEM

Charles M. Boland, Lakeland, Fla.

Application January 17, 1933, Serial No. 652,239

4 Claims. (Cl. 61—13)

This invention relates to combined heating and irrigating systems especially adapted for the growing of vegetation and has for the primary object, the provision of a device whereby the ground or soil in the vicinity of the vegetation may be heated to a desired temperature to prevent injury to the vegetation from sudden low temperatures and also may at any time desired furnish water to the soil and at temperatures higher than the ordinary climatic temperatures of the water.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary plan view partly in section illustrating a combined irrigation and heating system constructed in accordance with my invention.

Figure 2 is a plan view illustrating a series of branch outlet pipes connected to the main supply pipe of the system.

Figure 3 is a fragmentary sectional view illustrating a portion of the system associated with a sump in which water may accumulate from condensation of steam or in which water may be forced for irrigating the soil.

Figure 4 is a detail sectional view illustrating a protector or cover for the joints employed in the system.

Referring in detail to the drawing, the numeral 1 indicates a main conduit embedded in the ground to be treated and has extending laterally therefrom a plurality of branch or auxiliary conduits 2, each including a plurality of sections 3, the adjacent ends of which are slightly spaced to form outlets 4. Positioned over the adjacent ends of the sections are covers or protectors 5 to prevent the soil or other foreign matter from entering the outlets and into the auxiliary or branch conduits. The branch or auxiliary conduits communicate with the main conduit slightly above the bottom wall of the latter so that a sump will be provided in the lower portion of the main conduit. As shown in Figure 3 the main conduit extends to the surface of the ground and is closed by a removable cover 7. Located in the main conduit is a main supply pipe 8 to which is connected a plurality of branch pipes 9 by valves 10, the control handles of which extend through the cover 7. The branch pipes 9 extend downwardly and into the branch or auxiliary conduits 2 and are equipped at their free ends with regulating valves 11 provided with operating handles 12 extending to the surface of the ground. A steam feed pipe 13 is connected to the main pipe 8 and to a conventional type of steam boiler 14 for the purpose of furnishing live steam to the auxiliary pipes 9 and which steam may escape into the auxiliary conduits 2 in desired amounts by regulating the control valves 11. The steam in the auxiliary conduits passes through the outlets 4 into the ground for the purpose of heating the latter to a desired temperature. A certain amount of steam condenses in the auxiliary conduits and may drain therefrom into the sump provided in the main conduit. Also some of the condensed steam or fluid therefrom may escape through the outlets 4 to moisten the ground. The auxiliary pipes each being confined in the auxiliary conduits prevents the dirt or soil from coming in direct contact therewith and consequently eliminate corroding or caking of soil on the auxiliary pipes. The steam escaping from the auxiliary conduits besides heating the soil also transmits a certain amount of moisture to the soil.

A suction pipe 15 is located in the sump and is connected to a pump 16 operated by a motor 17. The pump is connected to the steam boiler so that water may be drawn from the sump to replenish the boiler. The pump 16 is preferably of the well known reversible type whereby it may be employed either as a suction medium or a medium for forcing a fluid. A water supply pipe 18 is suitably connected to the pump so that water may be forced into the sump, filling the main conduit and the auxiliary conduits when it is desired to give the ground or soil a thorough irrigation. Should it be desired to heat or raise the temperature of the water, steam may be introduced into the auxiliary conduits at the same time with the forcing of water therein.

The auxiliary conduits and auxiliary pipes 9 therein may be spaced any suitable distance from each other and the soil may be especially built up or developed about the auxiliary conduits so that rock or loose gravel will be adjacent to the auxiliary conduits with enriched soil banked or positioned over the stone or gravel. A bed of this kind will be easy to irrigate and heat to any desired temperature, thereby assuring proper growth and protection to the vegetation planted in the soil.

While I have shown and described the preferred embodiment of my invention, it will be understood that minor changes in construction, combination and arrangement of parts may be made without departing from the spirit and scope of my invention, as claimed.

Having described the invention, I claim:

1. A combined heating and irrigating system comprising a main conduit, a plurality of auxiliary conduits in communication with the main conduit, a main supply pipe in the main conduit, auxiliary pipes communicative with the main pipe and extending into the auxiliary conduits and in communication therewith, means for admitting steam to the main pipe, means for regulating the escape of steam to the auxiliary conduits from the auxiliary pipes, and means whereby water may be drawn from the main conduit or water forced into the main conduit.

2. A combined heating and irrigating system comprising a main conduit, a plurality of auxiliary conduits in communication with the main conduit and each including a plurality of sections having their adjacent ends spaced to form outlets, means for introducing steam in regulated amounts to the auxiliary conduits for escape therefrom by the outlets, and means for forcing water into the main conduit for supplying the auxiliary conduits.

3. A combined heating and irrigating system comprising a main conduit, a plurality of auxiliary conduits in communication with the main conduit and each including a plurality of sections having their adjacent ends spaced to form outlets, means for introducing steam in regulated amounts to the auxiliary conduits for escape therefrom by the outlets, means for forcing water into the main conduit for supplying the auxiliary conduits, and covers overlying the adjacent ends of the sections of the auxiliary conduits.

4. A combined heating and irrigating system comprising a main conduit embedded in the ground, a plurality of laterally extending auxiliary conduits in communication with the main conduit and each having a plurality of outlets, auxiliary pipes in the auxiliary conduits and extending into the main conduit, a main supply pipe in the main conduit, valve means between the auxiliary and main pipes, means for furnishing steam to the main pipe, control valves for regulating the flow of steam from the auxiliary pipes to the auxiliary conduits and controllable from the surface of the ground, and means whereby water may be forced into or removed from the main conduit.

CHARLES M. BOLAND.